United States Patent
Hennessey, Jr.

(10) Patent No.: US 8,482,884 B2
(45) Date of Patent: Jul. 9, 2013

(54) EMERGENCY UTILITY INTERRUPTION SYSTEM

(76) Inventor: William J. Hennessey, Jr., Bokeelia, FL (US)

( * ) Notice: Subject to any disclaimer, the term of this patent is extended or adjusted under 35 U.S.C. 154(b) by 611 days.

(21) Appl. No.: 12/284,827

(22) Filed: Sep. 25, 2008

(65) Prior Publication Data

US 2010/0073840 A1    Mar. 25, 2010

(51) Int. Cl.
*H02H 3/00* (2006.01)
*H02H 7/00* (2006.01)

(52) U.S. Cl.
USPC ............................................................. 361/1

(58) Field of Classification Search
USPC .................... 361/114, 1; 340/539.26, 628
See application file for complete search history.

(56) References Cited

U.S. PATENT DOCUMENTS

| | | | |
|---|---|---|---|
| 4,659,909 A | 4/1987 | Knutson | |
| 4,703,306 A * | 10/1987 | Barritt | 340/4.35 |
| 5,508,568 A | 4/1996 | Mammen | |
| 5,592,032 A | 1/1997 | Keizer et al. | |
| 5,670,074 A | 9/1997 | Kass et al. | |
| 5,945,017 A | 8/1999 | Cheng et al. | |
| 6,032,663 A | 3/2000 | Pencheon | |
| 6,044,913 A | 4/2000 | Stehling et al. | |
| 6,046,441 A | 4/2000 | Daffron | |
| 6,130,412 A * | 10/2000 | Sizemore | 219/481 |
| 6,262,668 B1 | 7/2001 | Mulvihill et al. | |
| 6,282,451 B1 | 8/2001 | White | |
| 6,380,852 B1 | 4/2002 | Hartman et al. | |
| 7,019,646 B1 * | 3/2006 | Woodard et al. | 340/539.26 |
| 7,199,721 B2 | 4/2007 | Shirlee | |
| 7,307,539 B2 | 12/2007 | Harvey et al. | |
| 7,898,427 B1 * | 3/2011 | Kim | 340/628 |
| 2006/0044133 A1 * | 3/2006 | Lou | 340/531 |
| 2006/0197660 A1 * | 9/2006 | Luebke et al. | 340/539.26 |
| 2007/0001865 A1 | 1/2007 | Rowe | |
| 2008/0018484 A1 | 1/2008 | Sager | |

OTHER PUBLICATIONS

Printout from website, www.firehomesafety.com, entitled "Stop Kitchen Fires with SafeStove", Copyright 2007 First Home Safety Corp. (4 pages).
Printout from website, www.stoveguard.ca, entitled "Stove Guard—The Best Stove Fire Prevention System", Copyright 2008 enterprising-ideas.com, (2 pages).

* cited by examiner

*Primary Examiner* — Rexford Barnie
*Assistant Examiner* — Christopher Clark
(74) *Attorney, Agent, or Firm* — Buchanan Ingersoll & Rooney PC

(57) ABSTRACT

A device is provided for the prevention of damage due to the continued supply of a utility to an appliance, the device comprising: 1) a detector which detects circumstances of present or impending emergency and responds by sending a detector signal to 2) a receiver which receives a signal from the detector and in response emits a receiver signal; 3) a transmitter which receives the receiver signal and in response signals a 4) restrictor to attenuate or quench a utility supply to an appliance.

18 Claims, 8 Drawing Sheets

110v Receiver / Transmitter Main Unit

Front View

Side View

220v Range Deactivator

Front View

Side View

220v Range Deactivator

Front View

Side View

110v Appliance Deactivator

Front View

Side View

110v or Battery Operated Water Solenoid Deactivator

Front View

Side View

110v or Battery Operated Gas Solenoid Deactivator

Front View

Side View 110v or Battery Operated Carbon Monoxide Solenoid Deactivator

Front View

Side View

110v/220v Oil Furnace Deactivator

Front View

Side View

EMERGENCY UTILITY INTERRUPTION SYSTEM

BACKGROUND OF THE INVENTION

According to statistics from the United States Fire Administration (USFA) the United States has one of the highest incidences of fire deaths in the industrialized world with over 5,000 deaths are reported each year, and over 100 firefighters killed, on average. Fire is responsible for more deaths than all other natural disasters combined. Many of these deaths, over 80%, occur in the home, making fire the third leading cause of accidental death in the home. Also, according to the USFA, cooking is a leading cause of residential fires and fire injuries, with fires usually occurring due to unattended cooking or human error.

Fire risk in the home is magnified by the presence of those most vulnerable. Senior citizens and children under the age of five have the greatest risk of fire death at nearly double that of the average population.

Overall, more than 2 million fires are reported annually, with an estimated annual cost of more than $9.4 billion. It is believed that many fires go unreported, accounting for untold additional injury and financial loss.

In a common occurrence in households around the world, a house fire begins with an unattended or malfunctioning appliance, particularly a stove. The heat-producing elements of a stove, whether they are gas or electric, can be the source of fires which begin and grow at the stove, sustained by the continued feed of power and/or gas to the stove. Many fires which begin on the stove top or in the oven would not grow to dangerous proportions but for the fact that the power and gas supplies maintain the oven and/or burner heating elements aflame or at otherwise elevated temperatures. The temperatures sustain the existence and growth of the fire such that it spreads beyond the stove to nearby areas having sufficient presence of flammable materials such that ultimately, the fire can only be managed by emergency measures. The role of the continued operation of the stove in the growth of the fire to damaging, emergency proportions is well understood.

However, millions of households remain at risk for appliance initiated fires. One reason is that purchasing a new stove in order to accrue the benefits of a fire safe-system is expensive enough that most families do not undertake the expense of appliance replacement. Furthermore, retrofitting an appliance with a system which can detect a fire and respond by curtailing power and/or other utilities can be as expensive as purchasing a new appliance. Thus, most homes remain at risk for appliance-initiated fire and the resultant devastation.

Natural disasters such as earthquakes, tornadoes and hurricanes are often followed by devastating fires which endanger survivors immobilized by rubble and complicate recovery efforts. These fires can result from electrical appliances such as televisions, clothes dryers and other appliances, particularly those that have the ability to store a charge when turned off. Other electrical appliances which are hazardous during an earthquake are those which have heating elements which may remain at high temperature even after the appliance tips over or which have elements which could come into contact with flammable materials during or after the disaster event.

Furthermore, gas-fed and electrical appliances can be a hazard during an earthquake. The potential for gas leaks to be created at a point in the gas line further down-line from the wall connection is high during an earthquake due to the rigidity of many lines and the fact that the appliance can easily be jolted out of position due to the tremor itself or floors shifting and items falling in the surrounding area. Leaking gas can then be ignited by electrical wires and heated elements.

BRIEF SUMMARY OF THE INVENTION

A need exists for an appliance safety system that can provide effective, reliable, and failsafe intervention early in the development of an emergency. In general, the present invention can reduce destruction and loss of life resulting from the continued supply of a utility during emergency situations. Furthermore, the present invention can attenuate or terminate the supply of a utility to a household appliance in circumstances in which the appliance is causing or contributing to an emergency situation. Notably, the present invention can reduce loss of life, property damage, and the associated costs of residential fires by cutting the gas and/or electric utility supply to appliances, such as stoves and water heaters, that have created a present or developing fire emergency.

Disclosed herein is a system which can prevent an appliance-initiated fire from growing in size such that it spreads beyond the appliance to areas of the home rich in flammable materials, becoming self-sustaining.

The present invention has the ability to use readily available alarms available worldwide, particularly those with auditory signals, which detect smoke, CO, explosive gas, water, etc. These alarms are generally easy to install and maintain, giving reliable early notification of impending or actual emergency. Such alarms, used by themselves, generally require that someone or something take action to intervene and mitigate damage that may occur.

Some existing designs actually require and rely upon combustion to activate. Other designs require end user manipulation of the system due to timers, motion sensors, battery maintenance as the primary power source, interrupt buttons, and delay (normal operation) settings.

The inventive system effectively responds to indicia of actual or developing appliance mediated emergencies by reducing or quenching the supply of one or more utilities to the appliance. The system can respond to commonly available alarms such as smoke, carbon monoxide, explosive gas, and water alarms, for example, affecting the supply of utilities such as, for example, electrical power, natural gas, water, etc., effectively diminishing or quenching the supply of the utility to individual outlets and appliances.

The inventive system functions in a failsafe manner with minimal user manipulation after installation. Unlike other systems, the inventive system does not give a substantial number of incidents in which the system operates in the absence of an emergency. Furthermore, the inventive system operates in such a way that in the absence of an emergency, it has no effect, or at most, a negligible effect, on the normal operation of the appliance.

In one embodiment, the invention comprises two units which communicate by wireless, digital, radio signal. In an additional embodiment, the system responds to an alarm having a signal loudness in the range of from about 50 dB to about 100 dB, and effectively prevents or mitigates damage caused by the appliance from which the alarm stimulus originated by curtailing or completely quenching the supply of one or more utilities to the appliance.

In another embodiment, the system can also respond to an emergency stimulus by curtailing or quenching a utility, such as, for example, the gas supply to an oven, even when the alarm stimulus is due to a different source entirely, such as a sofa ignited by a cigarette. In other embodiments, the inventive system is used in conjunction with 110 volt, 220 volt, gas or water appliances.

In one embodiment, some or all of the system is powered by AC, but backed up by battery, and thus the system retains its ability to function even after power loss. For example, one or more of the detector, receiver, transmitter or restrictor (discussed below) can be powered by AC, with a battery back-up. In one embodiment, the detector and receiver are together in a unit, the transmitter and restrictor are together in a unit, and In one embodiment, the unit can be actively reset by end user. In other embodiments, the inventive system design provides one or more audible and/or visual indicators for activation and the need for reset. In another embodiment, the system is returned to normal operation by actively resetting it. In yet another embodiment, an active reset means is provided on a unit that is remotely located a safe distance from affected appliance(s).

In a preferred embodiment, the present invention employs digital RF communication between a detector and one or more receivers, allowing the control of many receivers and thereby safely cutting power to many appliances at once. Furthermore, the present invention allows easy retro fit capability for existing appliances and allows for safe, reliable use in close proximity to residential living conditions by eliminating signal interference either internally or externally.

Figure 16:
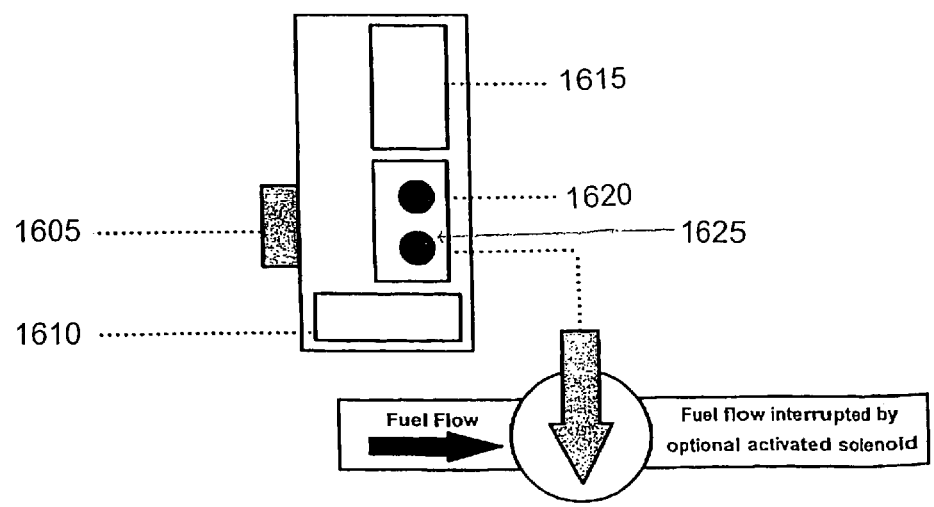

1525: Power
1530: 220 v Hook-up (gnd-neutral-2 hots)
1535: Speaker/alarm
1540: Manual reset button
1545: 220 v Hook-up (gnd-neutral-2hots)
FIG. 16, 110 v/220 v Oil Furnace Deactivator (side view):
1605: Manual reset
1610: Rechargeable battery back up
1615: Channel selection door
1620: Optional 110 v power jack
1625: Optional solenoid jack

DETAILED DESCRIPTION OF THE INVENTION

Detector

The system comprises a detector which detects early indications of a developing emergency, such as from sources already mentioned, as well as other sources, including, but not limited to, hard-wired cook top stoves, gas fireplaces, gas and electric clothes dryers, oil-fired furnaces and gas grills. In a preferred embodiment, the detector detects smoke from a fire. In other embodiments, the detector detects other indications of hazardous situations, such as elevated temperature produced by a range fire or oven fire. In another embodiment, the detector detects earthquake tremors. In yet another embodiment, the detector is a gas detector which detects gaseous indications of a developing emergency, such as, for example, natural gas; carbon monoxide, other combustion products and the like. In still other embodiments, the detector detects elevated surrounding temperatures, particles of smoke, increased humidity, structural disturbances, or other indicators of present or incipient emergency circumstances.

In some embodiments, the detector has the ability to measure not just the presence of a stimulus, but characteristics of the stimulus. For example, with respect to fires, the intensity; intensity as a function of time; details of the particular stimulus such as likely source (cooking fires which are high in airborne grease, electrical fires which are high in burning polymers, other types of fires which have different combustion product profiles). The detector can have the ability to measure vibrations in detail including magnitude, intensity pattern as a function of time, etc.

In some embodiments, the detector has the ability to compare the measured stimulus information against preset conditions and emit a signal accordingly. For instance, such a detector can send a signal upon the receipt of a tremor profile which is in accord with an earthquake. The same detector does not send such a signal upon measuring a tremor profile which is in accord with a slammed door or structural shuddering due to high winds. In additional embodiments, the detector does not send a signal if the smoke has the concentration/time or combustion product profile in accord with cooking smoke from fried foods. The detector does send a signal if the smoke has a profile in accord with a sudden cooking fire or other type of fire emergency.

The detector has the capacity to send a signal in response to the detection of the stimulus. The signal can be electromagnetic, such as, for example, infrared or radio frequency; electronic or electric. Preferred is an audio signal, preferably in the range of from about 50 to 110 decibels or an electronic signal sent through a hardwired connection. Such a signal can be digital or analog.

The signal can be sent immediately upon detecting the stimulus, such as, for example, the detection of a sudden presence of large amounts of carbon monoxide or smoke. Alternatively, the signal can be sent some time after the receipt or detection of the stimulus. For example, in some circumstances, it may be desirable that the detector refrain from sending an immediate signal. For example, a small cooking fire can produce copious amounts of smoke and heat. However, if the fire is not unattended and out of hand, it may be desirable to take local measures to quash the fire rather than to have the system take more drastic measures and activate the restrictor, interrupting the gas and/or power supply to the stove. In such a case, it might be desirable to have the signal from the detector delayed or overridden until the smoke, heat and/or flames have persisted for a period of time or increase above a threshold intensity as measured by the detector.

As another example, the need for the system to differentiate between significant earthquakes and minor tremors such as slammed doors may be characterized by a signal that is delayed until the tremors have reached a preset amplitude threshold or persisted for a predetermined amount of time.

The signal produced by the detector may simply relay the presence of a stimulus. However, if desired, the signal may contain any additional information measured by the detector, such as the magnitude of the stimulus, the type of stimulus. For example, a detector may indicate not only that smoke is present, but also the relative amount of smoke produced by a fire, the smoke or other combustion product concentration profile as a function of time, and other measured information, such as that indicated in the prior paragraphs.

In one embodiment the detector is a commercial smoke detector. In other embodiments, the detector is a detector of one or more of the following: carbon monoxide, carbon dioxide, or other combustion products, methane, water, tremors and/or other vibrations, or humidity.

Receiver

The receiver has the ability to receive the signal produced by the detector and produce its own signal ("receiver signal") in response to the detector signal. The detector signal can be received via a variety of media, depending upon the medium of the signal. In a preferred embodiment, the detector signal is an audio signal, preferably having a loudness above 30 decibels, and more preferably having a loudness up to and including 100 decibels. In other embodiments, the detector signal is sent via a hard-wired electrical connection to the receiver, which has the capability of receiving and responding to such a signal.

In response to the receipt of the detector signal, the receiver has the ability to respond by sending its own signal, preferably an electromagnetic signal, and in an embodiment, a radiofrequency signal. As with the detector elucidated above, if desired, the receiver signal can be sent upon receipt of the detector signal, or it can be delayed for the same reasons discussed for the detector signal. However, instead of the detector delaying the detector signal, in additional embodiments, the receiver delays the receiver signal.

In an embodiment, the detector and the receiver are integrated into a single unit which can be easily moved, and which can be positioned remotely or locally with respect to an appliance. Examples of such detector/receiver systems can include detectors such as detectors of smoke, carbon monoxide and other combustion products; tremors and vibrations; relative humidity; audio patterns associated with an incipient emergency; etc. In preferred embodiments, the units are battery operated. In other embodiments, the units can be placed in positions in which they have an increased probability of detecting early indications of an incipient emergency, such as in the immediate vicinity of a fireplace, a furnace, a hot water heater, etc.

In another embodiment, the detector and receiver are separate. This embodiment enables the easy use of commercially available alarms, such as smoke detectors and other detectors of combustion products such as particulate, carbon monoxide, carbon dioxide; as well as of other conditions indicative of a present or incipient fire or other emergency; examples of such alarms include motion detectors, vibration detectors, humidity detectors, etc. The detector, upon detection of the alarming condition (smoke, humidity, etc.) emits a signal. The signal is preferably one which can be wirelessly received, such as audio or electromagnetic radiation, although the present invention is directed at detectors which communicate the signal electrically or electronically. Preferably, the signal is audio radiation having a loudness in the range of from about 50 to 100 dB, with 80 to 90 dB preferred. The detector can be placed in a position in which it will most likely provide an early warning of emergency conditions, such as near the appliance at risk. It should be noted that a detector which is separate from the receiver enables the positioning of the receiver away from the appliance at risk, as well as away from the detector. Such an ability is an advantage in situations in which the detector must be positioned close to the appliance in order to receive a stimulus of sufficient strength to be activated, yet the stimulus itself, such as heat or humidity, has the potential to damage the receiver, preventing it from detecting the signal from the detector.

In a preferred embodiment, the detector detects a signal from an existing alarm, such as a smoke alarm. In this embodiment, the conditions of impending emergency detected by the detector comprise a signal from an existing alarm, such as, for non-limiting example, the audio signal from a smoke detector. General examples of alarm signals detected by the detector in this embodiment include audio signals, radio signals, electric or electronic signals, and other types of signals, particularly those produced by home alarms such as fire, smoke, natural gas, combustible gas, carbon monoxide, motion, tremor/vibration, and other types of alarms. In one embodiment, the alarm signal detector is together with the receiver as a single unit. In a preferred embodiment, the detector/receiver of this embodiment operates as a centralized "command center" for multiple restrictors. In the case of such an embodiment, the detector/receiver unit has the capacity to control one or multiple utility supplies to one or multiple appliances. In a further embodiment, two or more of the multiple utility supplies are associated with transmitters (described infra) activated by signals which differ in some aspect such as type (e.g., for non-limiting example, radio versus electronic) or type-specific parameter such as wavelength. In another embodiment, the command center has the capacity to emit signals on multiple radio frequency channels.

Transmitter

The present invention also comprises a transmitter capable of receiving the receiver signal. In one embodiment, the transmitter is in two-way communication with the receiver. As with the receiver and the detector, the transmitter sends its own signal to one or more restrictors (discussed below) in response to a received signal (in this case the receiver signal), and if desired, the transmitter signal may be delayed or not sent.

In one embodiment, the transmitter and restrictor are together in a unit which can be inserted inline with respect to a utility. Thus, if the restrictor affects the electrical supply, the restrictor is placed in an inline position with respect to the electrical input. In one embodiment the restrictor/transmitter unit can be plugged into a wall electrical outlet, and the power cord from the appliance can be plugged into the unit. If the restrictor affects the water supply, it can be inserted inline with the water supply. In one embodiment, the restrictor/transmitter unit can be attached at the water outlet directly from the wall, with a standard water connection for connecting directly to the supply hose of the appliance. In another embodiment, it can be placed inline at the water inlet of the appliance.

In another embodiment, the transmitter is in two way communication with the receiver and it receives information, either directly or indirectly, which corresponds to situational parameters at the location of the appliance.

Restrictor

The system of the present invention comprises one or more restrictors, i.e., the apparatus which cuts the supply of the utility (i.e., gas, electricity, water, etc.) The restrictor has the ability to receive a signal from the transmitter. While the signal can be one of a variety of different types, such as electromagnetic radiation or sound waves, preferred is a signal which is received over hard wiring, such as an electrical signal. A shut off system for an appliance such as a stove may have more than one restrictor. For example, the system may comprise a restrictor specific to the electrical supply, and one specific to the gas supply. As another example, an appliance such as water heater may have three restrictors, one specific to the electrical supply, one specific to the water supply, and one specific to the gas supply.

As with the receiver and transmitter, the signal from the transmitter to the restrictor can be as simple as signaling the restrictor to completely restrict the flow of the utility, for example, completely quench the supply of gas, water or electricity. However, within the ambit of the present invention is a signal received by the restrictor which contains additional information, such as the degree to which the utility is to be shut off, which utilities are to be shut off, etc. Such a system may also comprise restrictors having the capacity to respond to these signals to restrict a utility to a range of degrees, such as, for example, a continuous range of degrees, or a range of discrete degrees.

For example, in the case of an over-heated furnace or water heater, it may be desirable to cut off the electricity which powers the striker (starter) and cut the gas supply to the degree that only the pilot light remains lit. Such a solution avoids extinguishing the pilot light, which can be difficult to reignite. Thus, upon the conclusion of the overheating emergency, the stove or water heater can have function easily restored simply by restoring the utilities without having to reignite the pilot light.

In a preferred embodiment, the transmitter and the restrictors with which they communicate are in electronic communication with each other, however, in other embodiments, the contact can be magnetic or via electromagnetic radiation.

Preferred embodiments of the present invention sense an incipient emergency through a detector, relay a signal to one or more local receivers, each of which transmits a signal to a transmitter in communication with a restrictor. However, included within the ambit of the present invention are embodiment systems having feedback capability to controlling functions at stages between the detection of the signal and the curtailing of the utility.

In a preferred embodiment, the transmitter and restrictor are integrated into a single unit which can be installed inline with the utility to be interrupted. In a preferred embodiment, the restrictor interrupts the power supply to a stove, and the unit is positioned between a power supply outlet and an electrical stove power cord, preferably with the cord plugged into the unit, which is, in turn, plugged into the power supply outlet.

In another embodiment of the present invention, the detector detects early indications of a developing emergency which are not initiated by the stove or other appliance, but which are likely to be exacerbated by the continued supply of power or other utility, such as gas, to the appliance. For example, flames and/or heat from a fire or another source of heat, such as, for example, a cigarette-initiated smoldering piece of furniture, or a pile of solvent soaked rags which has ignited.

Heretofore, the disclosure has been primarily directed at fires caused by ovens and ranges. In another embodiment, the detector detects earthquake vibrations, and the system interrupts the gas and/or electric supply to an appliance.

Upon detection of a condition indicative of impending hazard, the detector, either directly or through a signal to a transmitter, emits an electromagnetic signal. Preferably, the signal is a radiofrequency signal, and more preferably the signal is digital.

In one embodiment, the signal is received by a receiver which can detect electromagnetic radiation, and preferably radio frequency radiation.

The receiver sends a signal to a restrictor which is inline with the power or utility supply to the appliance. The restrictor is in physical proximity or electrical communication with the utility to be controlled. For instance, if the desired response to the detector signal is that the power supply to an appliance be interrupted, the restrictor is a switch which inline between the power supply and the appliance. If the desired response to the detector signal is that the water supply to an appliance such as a washer, be interrupted, the restrictor is a valve such as, for example, a solenoid valve, which is inline between the appliance and the water supply. The restrictor closes the valve in response to a signal from the receiver. If the desired response to a detector signal is that the gas supply to a stove be interrupted, the restrictor is a gas valve, etc. In response to a signal from the receiver, the restrictor closes the gas valve. In a preferred embodiment, the receiver and the restrictor are integrated into a single unit which can be placed inline with the appliance.

It should be noted that the present invention is not limited to situations in which an appliance-caused emergency results in the curtailing of utilities to the appliance. It is of further use in situations in which continued utility supply to an appliance would exacerbate an emergency created elsewhere. Such a situation could arise, for example, upon the incident of a fire from a burning Christmas tree which has the potential to become a greater emergency due to an operating gas stove. Another example is a leaking basement water heater which threatens to become an electrical hazard as the water rises to reach the circuitry in washers and dryers. In the first case, the present invention can comprise, for example, a detector located near the fire source, and a gas attenuation valve in line with the stove gas supply. In the second case, the invention can comprise, for example, a humidity detector and an electrical switch inline with the electrical supply to the one or more laundry appliances.

Example 1

110V Detector/Receiver Command Center

The 110 v Command Center-a central processing unit that is accessible to the end user and can notify, by alarm, the end user of any potential hazards that may arise from pre-existing household monitoring alarms and/or detectors. Such as, but not limited to, smoke, carbon monoxide, gas, water, radon, etc.

The Command Center disables the source of the hazard by sending a digitally coded radio frequency signal to the predetermined transmitter which is in communication with the appropriate restrictor. After the radio frequency is received one of the following occurs: In electrical appliance applications the electrical contacts will open up within the deactivating device. In gas and water applications, a solenoid placed in line with the gas or water main entry will operate to shut off utility supply.

FIGS. 1 & 2

Microphone: "Listens" for a high decibel alarm from a pre-existing household monitoring alarm and/or detector, such as, but not limited to, detectors of smoke, carbon monoxide, gas, water, radon, etc. Once an alarm is sounded and the microphone "hears" the alarm it sends a digitally coded signal to the corresponding appliance deactivator for interruption.

Alarm/Speaker: This will begin to alarm at the moment of interruption to the corresponding appliance utility. This will also warn the end-user of a low-battery in the battery back up unit in case of a power outage. This alarm can be silenced by depressing the manual reset button once.

Power Indicator: Indicates that there is power to the Receiver/Transmitter unit, whether by 110 v or battery operation.

Channel Usage LED Indicators: LEDs will light up when a channel is being utilized by a specific appliance.

Fault LED Indicators: LEDs bulbs light up when a specific appliance becomes deactivated.

Internal Communication Antenna: This antenna will send an RF signal blast to the transmitter to interrupt power or engage solenoid to curb or eliminate hazard. This antenna can also accept an RF signal from the transmitter corresponding to the appropriate appliance. Once the transmitter sends the signal back to the command center, a corresponding Fault LED Indicator lights (RED) and the Alarm/Speaker sounds to alert the end-user. This Internal Communication Antenna will also be utilized to synchronize the Command Center with the corresponding deactivator unit.

Manual Reset Button: Actuating button silences the alarm. The Manual Reset Button also reactivates the restrictor by pressing and holding down for a predetermined amount of time.

Rechargeable Battery: This replaceable, rechargeable battery powers the Command Center in case of power outages or where power is not accessible.

110 v Plug-in: Receiver powered by any grounded 110 v outlet.

Channel Selection Door: Under door is a series of DIP switches that program frequencies to a specific appliance in conjunction with the channel usage LED indicators and Fault LED Indicators.

Example 2

220V Transmitter/Restrictor Range Deactivator

The 220 v Range Deactivator provides a way to disable the range in case of an emergency. Pre-existing household monitoring smoke alarms and/or detectors are utilized in conjunction with a Detector/Receiver (FIGS. 1 & 2) to disable the range through a digitally coded RF signal.

The Range Deactivator disables the source of the hazard upon receiving a RF signal from the Detector/Receiver. After the digitally coded radio frequency is received by the Range Deactivator, it performs one of the following functions: If an electrical appliance application, the electrical contacts open up within the range deactivator device, interrupting the electrical supply. In gas applications, a solenoid, placed in line with the gas main entry or at the appliance, attenuates gas supply.

Range Deactivator is useful for after-market ranges.

FIGS. 3 & 4

Power Indicator: Indicates power to the Range Deactivator.
Internal Communication Antenna: Antenna sends and receives digitally coded RF signals to and from the Detector/Receiver to interrupt power or engage solenoid to curb or eliminate a potential hazard. Antenna also used to synchronize the deactivator with the Detector/Receiver Unit.
220 v Plug-in: Range Deactivator powered by 220 v outlet.
Channel Selection Door: Under door is a series of DIP switches that program digitally coded frequencies to the Detector/Receiver Unit. These DIP switches can also determine the electrical contacts which open up when a hazard arises. Thus the range can become de-energized, allowing the range clock and timer to continue to operate.

Example 3

220V Transmitter/Restrictor Range Deactivator

The 220 v Range Deactivator disables a range in event of an emergency. Pre-existing household monitoring smoke alarms and/or detectors are utilized in conjunction with a Detector/Receiver (FIGS. 1 & 2) to disable the range through a digitally coded RF signal.

The Range Deactivator disables the source of the hazard upon receiving a Radio Frequency signal from the Detector/Receiver. After the digitally coded radio frequency is received by the Range Deactivator, it performs one of the following functions: In electrical appliance applications, the electrical contacts open up within the range deactivator device, interrupting the electrical supply. In gas applications, a solenoid in line with the gas main entry attenuates gas supply.

Range Deactivator can be used with after market ranges.

FIGS. 5 & 6

Power Indicator: Indicates power to the Range Deactivator.
Internal Communication Antenna: This antenna sends and receives digitally coded RF signal blasts to and from the Receiver/Transmitter to interrupt power or engage solenoid to curb or eliminate a potential hazard. This antenna will also be used to synchronize the deactivator with the Detector/Receiver Unit.
220 v Plug-in: Range Deactivator powered by 220 v outlet.
Channel Selection Door: Under this door will be a series of DIP switches that program digitally coded frequencies to the Detector/Receiver Unit. These DIP switches can also determine the electrical contacts which open up when a hazard arises. Thus the range can become de-energized, allowing the range clock and timer to continue to operate.

Example 4

110V Transmitter/Restrictor Appliance Deactivator

The 110 v Appliance Deactivator provides a way to disable a 110 v appliance (such as toaster ovens, microwaves, etc.) in event of an emergency. Pre-existing household monitoring smoke alarms and/or detectors are utilized in conjunction with a Detector/Receiver (FIGS. 1 & 2) to disable the 110 v appliance through a digitally coded RF signal.

This Appliance Deactivator will disable the electrical source by receiving a Radio Frequency blast from the Detector/Receiver. After the digitally coded radio frequency is received by the Appliance Deactivator, it will interrupt and disable the appliance until the end-user inspects and manually resets the appliance at the Detector/Receiver.

FIGS. 7 & 8

Power Indicator: Indicates power to the Appliance Deactivator.
Internal Communication Antenna: Antenna sends and receives digitally coded RF signals to and from the Detector/Receiver to interrupt 110 v power. Antenna can also be used to synchronize the deactivator with the Detector/Receiver Unit.
110 v Plug-in: Appliance Deactivator powered by any grounded 110 v outlet.
Channel Selection Door: Under this door is be a series of DIP switches that can program digitally coded frequencies to the Detector/Receiver Unit.

Example 5

110V or Battery Operated Transmitter/Restrictor Water Solenoid Deactivator

Figure 9:
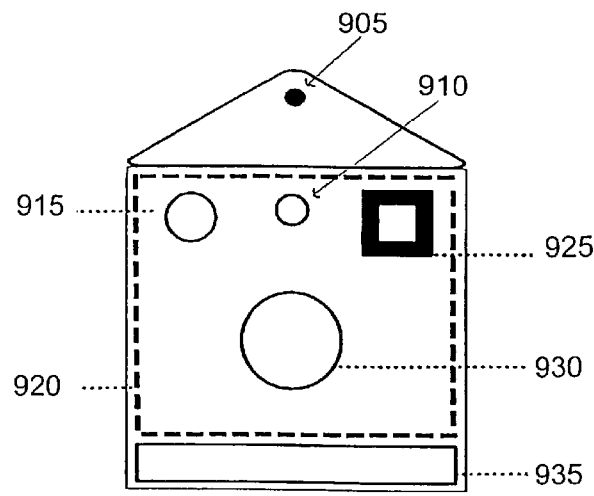
Figure 10:
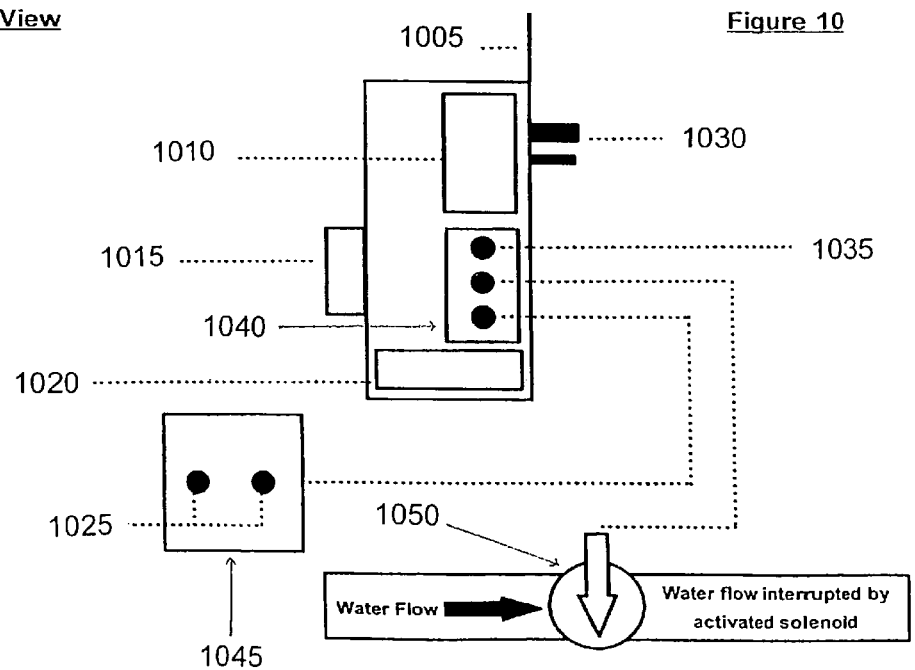

The 110 v or Battery Operated Water Solenoid Deactivator (FIGS. 9 & 10) is easily accessible to the end user and notifies the end user, by alarm, of arising hazards.

Figure 1:
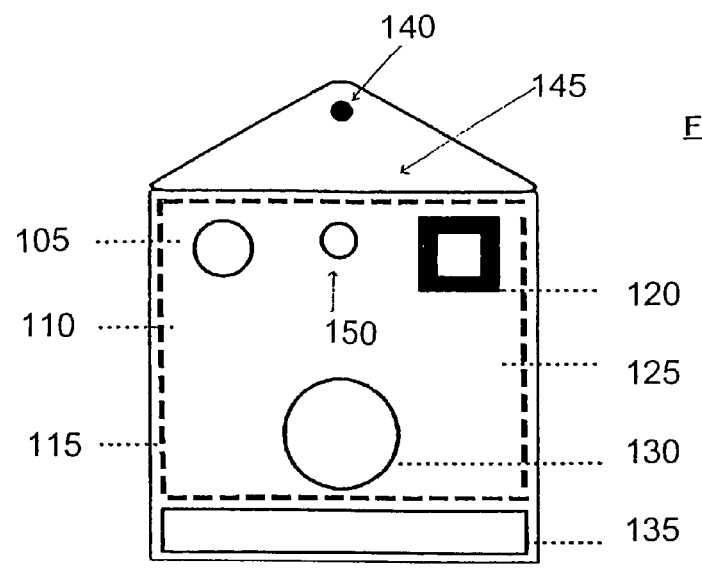
FIG. 1, 110 v Receiver/Transmitter Main Unit (front view):
105: Microphone
110: Channel usage LED indicators
115: Internal communication antenna
120: Alarm/speaker
125: Fault LED Indicators
130: Manual reset buttons
135: Rechargeable battery back up
140: Receptacle
145: Stay plate
150: Power
FIG. 2, 110 v Receiver/Transmitter Main Unit (side view):
205: Stay plate
210: Manual reset button
215: 110 v plug-in
220: Channel selection door
225: Rechargeable battery back up
FIG. 3, 220 v Range Deactivator (front view):
305: Power
310: Internal communication antenna
315: 220 v appliance plug-in
FIG. 4, 220 v Range Deactivator (side view):
405: 220 v plug-in
410: Channel selection door
FIG. 5, 220 v Range Deactivator (front view):
505: Power
510: Internal communication antenna
515: 220 v appliance plug-in
FIG. 6, 220 v Range Deactivator (side view):
605: 220 v plug-in
610: Channel selection door
FIG. 7, 110 v Appliance Deactivator (front view):
705: Receptacle
710: Stay plate
715: Power
720: Internal communication antenna
725: 110 v plug-in
FIG. 8, 110 v Appliance Deactivator (side view):
805: Stay plate
810: 110 v plug-in
815: Channel selection door
FIG. 9, 110 v or Battery Operated Water Solenoid Deactivator (front view):
905: Wall mount
910: Power
915: Microphone
920: Internal communication antenna
925: Alarm/speaker
930: Manual reset button
935: Rechargeable battery back up
FIG. 10, 110 v or Battery Operated Water Solenoid Deactivator (side view):
1005: Stay plate
1010: Channel & radio frequency selection door
1015: Manual reset button
1020: Rechargeable batter back up
1025: Conductivity posts
1030: 110 v plug-in
1035: AC adaptor plugs into 110 v source
1040: Jacks
1045: Water sensor
1050: Solenoid
FIG. 11, 110 v or Battery Operated Gas Solenoid Deactivator (front view):
1105: Wall mount
1110: Power
1115: Microphone
1120: Internal Communication Antenna
1125: Alarm/speaker
1130: Manual reset button
1135: Rechargeable battery back up
FIG. 12, 110 v or Battery Operated Gas Solenoid Deactivator (side view):
1205: Stay plate
1210: Channel & radio frequency selection door
1215: Manual reset button
1220: Rechargeable batter back up
1225: Gas sniffing sensor
1230: 110 v plug-in
1235: AC adaptor plugs into 110 v source
1240: Jacks
1245: Solenoid
FIG. 13, 110 v or Battery Operated Carbon Monoxide Solenoid Deactivator (front view):
1305: Wall mount
1310: Power
1315: Microphone
1320: Internal communication antenna
1325: Alarm/speaker
1330: Manual reset button
1335: Rechargeable battery back up
FIG. 14, 110 v or Battery Operated Carbon Monoxide Solenoid Deactivator (side view):
1405: Stay plate
1410: Channel & radio frequency selection door
1415: Manual reset button
1420: Rechargeable batter back up
1425: Carbon monoxide sensor
1430: 110 v plug-in
1435: AC adaptor plugs into 110 v source
1440: Jacks
1445: Solenoid
FIG. 15, 110 v/220 v Oil Furnace Deactivator (front view):
1505: 110 v Hook-up (hot-neutral-ground)
1510: Microphone
1515: Internal communication antenna
1520: 110 v Hook-up (hot-neutral-ground)
Figure 2:
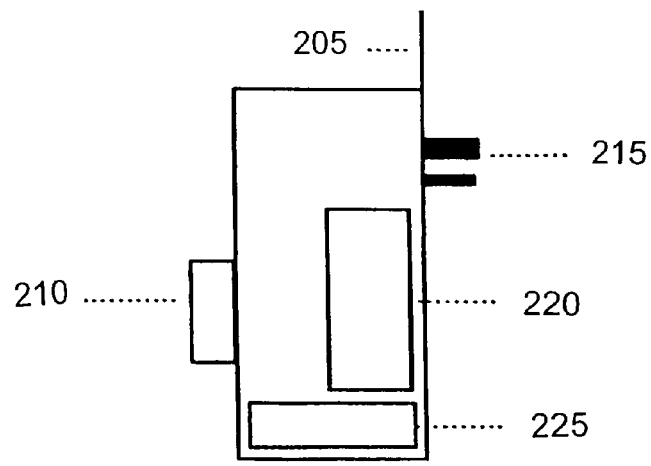
Figure 3:
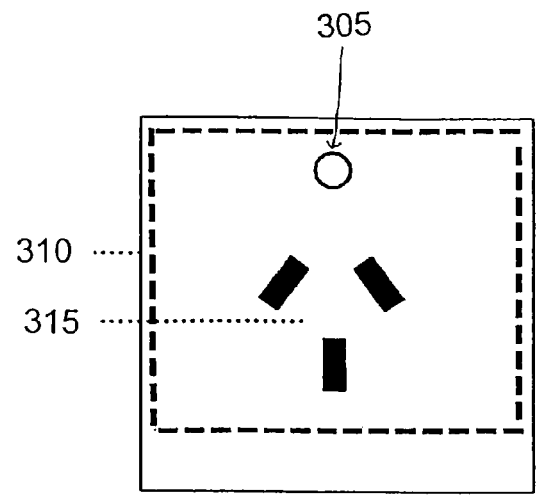
Figure 4:
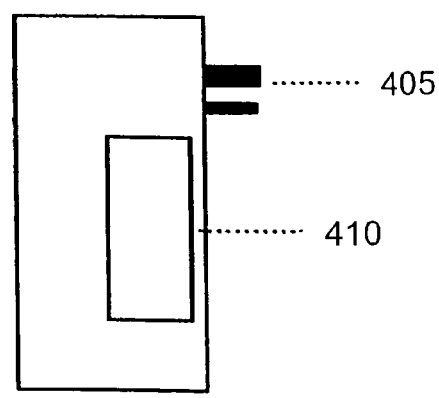
Figure 5:
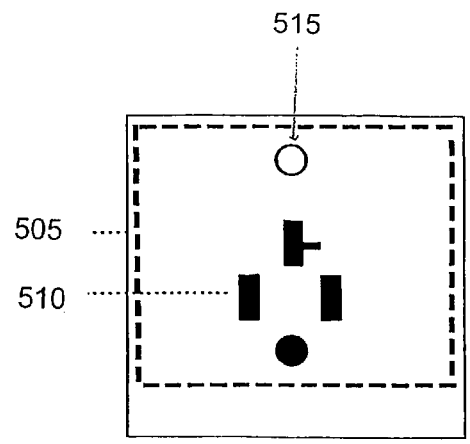
Figure 6:
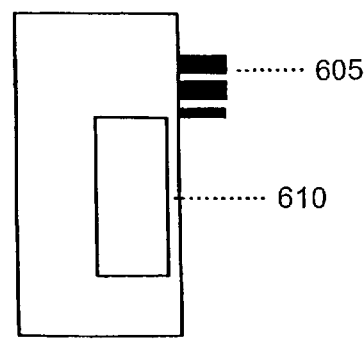
Figure 7:
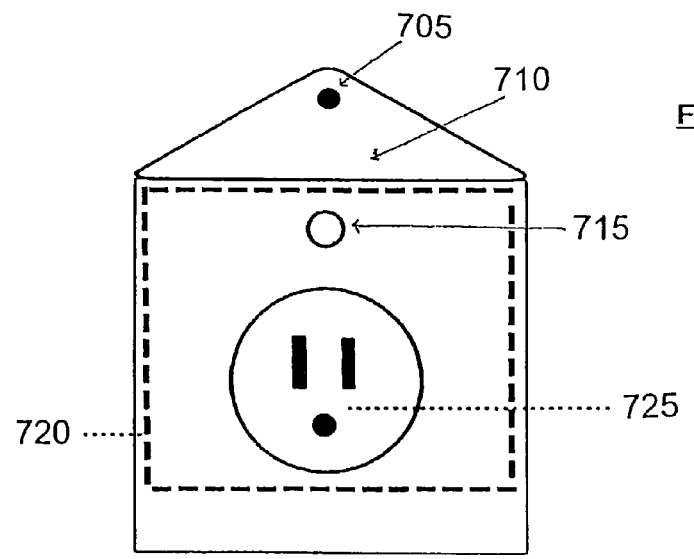
Figure 8:
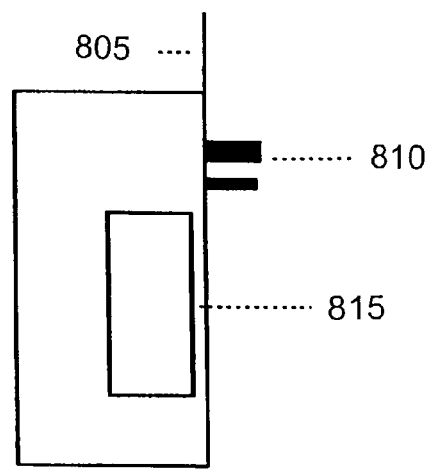

It disables the source of the hazard by utilizing a Water Sensor with conductivity posts. When these two posts become wet and are able to conduct a low voltage between them, the deactivator immediately shuts down the source of the water by tripping an in-line water solenoid, preventing excessive water damage from occurring. This Deactivator can be a stand alone operated unit, or it can be synchronized with a Detector/Receiver Main Unit (FIGS. 1 & 2). The Main Unit alarms when the Deactivator sends a RF signal. The Deactivator can also be reset from the Main Unit. The Deactivator operation can also be powered by a rechargeable battery where 110 v source is not present. This Deactivator can be installed throughout the house at any water supply, or preferably at the water main where the outside water source comes into the home.

FIGS. 9 & 10

Microphone: "Listens" for a high decibel alarm from other water deactivators, allow other areas of the building to be shut down in a "domino effect." This is optional and controlled by the interior DIP switch settings, and thus can be turned off.
Alarm/Speaker: Begins to alarm at the moment of interruption to the corresponding water deactivator. Can also be set to warn the end-user of a low-battery in the battery back up unit. This alarm can be silenced by actuating the manual reset button.
Power Indicator: Indicates power to the Deactivator unit, whether by 110 v or battery operation.
Internal Communication Antenna: Antenna can send an RF signal to the Detector/Receiver Unit (FIGS. 1 & 2) in the event of a potential water hazard Antenna can also accept the RF signal from the Detector/Receiver Unit (FIGS. 1 & 2) for remote resetting purposes. Once the Water Deactivator sends the signal back to the Detector/Receiver, a corresponding Fault LED Indicator lights (RED) and the Alarm/Speaker will sound to alert the end-user. Antenna can also be used to synchronize the Detector/Receiver to the corresponding Deactivator unit by utilizing DIP switch settings.

Manual Reset Button: Actuation mutes alarm. The Manual Reset Button can also reactivate the Deactivator unit by pressing and holding down for a predetermined amount of time. This can also be accomplished at the in-synch Detector/Receiver Main Unit (FIGS. 1 & 2).

Rechargeable Battery: Replaceable, rechargeable battery can power the Water Deactivator in case of power outages or where power is not accessible.

110 v Plug-in: Receiver powered by any grounded 110 v outlet. This Plug-in will be rotatable out of the way in case it is necessary to do a flush wall mount where 110 v power is not being utilized.

Channel Selection Door: Under this door are a series of DIP switches that can accomplish a series of programmable features of the Water Deactivator.

Water Sensor: The Water Sensor will be utilized where the unit will be a stand alone unit. This sensor will not be required if the Deactivator is in line with other Deactivators and it is only awaiting an RF signal from another Water Deactivator. However, the Water Sensor can be used even if the end-user has no use for it at the desired location.

Water Solenoid: The Water Solenoid is controlled by the Water Deactivator. The solenoid remains open until signaled to close by an RF signal. It can be reset by the Water Deactivator Manual Reset Button, or the Detector/Receiver Unit (FIGS. 1 & 2).

Example 6

110V or Battery Operated Transmitter/Restrictor Gas Solenoid Deactivator

Figure 11:
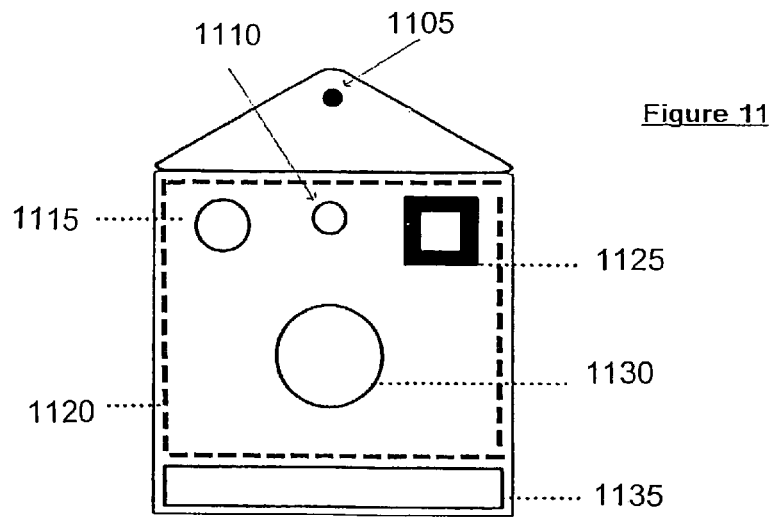
Figure 12:
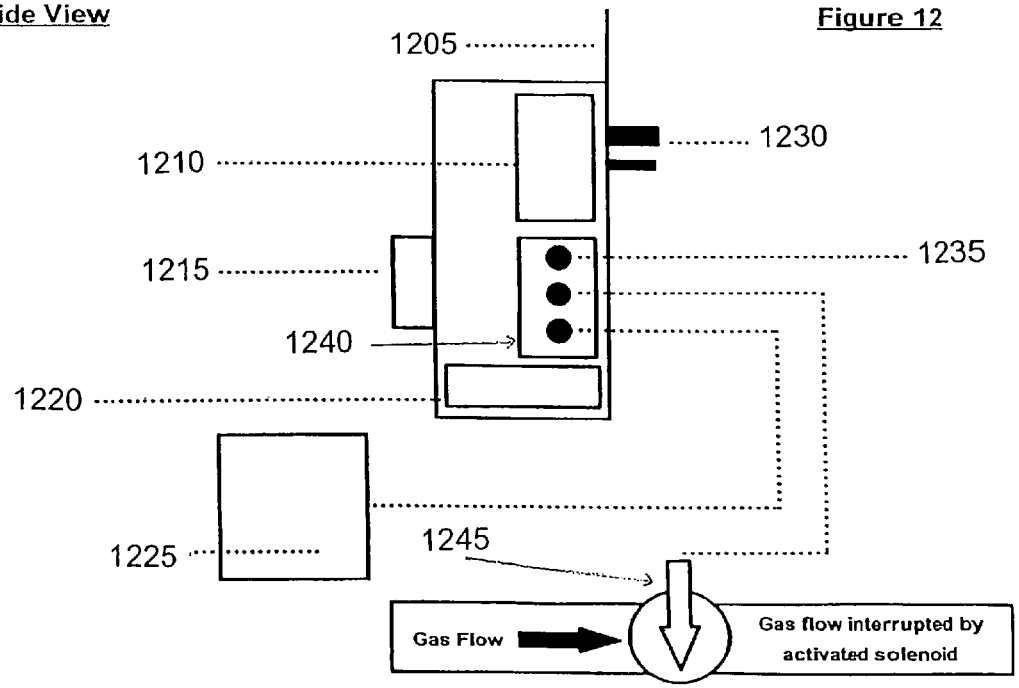

The 110 v or Battery Operated Gas Solenoid Deactivator (FIGS. 11 & 12) is easily accessible to the end user and notifies the end user, by alarm, of any potential hazards that may arise from dangerous gases such as, for example, natural gas or propane.

The Gas Deactivator disables the source of the hazard by utilizing a gas detecting sensor. When the sensor detects gas, the deactivator attenuates the gas supply by tripping an in-line gas solenoid, thus minimizing the likelihood of gas explosion. The Deactivator can be a stand alone, or it can be synchronized with a detector/receiver unit (FIGS. 1 & 2). This allows an alarm on the Main Unit to sound in a central area that an end-user can be alerted to possible emergency situations. The Main Unit alarms when the Gas Deactivator sends a RF signal. The Gas Deactivator can also be reset from the Main Unit. The Gas Deactivator has the ability to operate off of 110 v or a rechargeable battery where 110 v source is not present. This Gas Deactivator can be installed throughout the house at any gas supply, or preferably at the gas main where the outside gas source comes into the home.

FIGS. 11 & 12

Microphone: "Listens" for a high decibel alarm from other gas deactivators, allow other areas of the building to be shut down in a "domino effect." This is optional and controlled by the interior DIP switch settings, and thus can be turned off.

Alarm/Speaker: Begins to alarm at the moment of interruption to the corresponding gas deactivator. Can also be set to warn the end-user of a low-battery in the battery back up unit. This alarm can be silenced by actuating the manual reset button.

Power Indicator: Indicates power to the Deactivator unit, whether by 110 v or battery operation.

Internal Communication Antenna: Antenna can send an RF signal to the Detector/Receiver Unit (FIGS. 1 & 2) in the event of a potential gas hazard Antenna can also accept the RF signal from the Detector/Receiver Unit (FIGS. 1 & 2) for remote resetting purposes. Once the gas Deactivator sends the signal back to the Detector/Receiver, a corresponding Fault LED Indicator lights (RED) and the Alarm/Speaker will sound to alert the end-user. Antenna can also be used to synchronize the Detector/Receiver to the corresponding Deactivator unit by utilizing DIP switch settings.

Manual Reset Button: Actuation mutes alarm. The Manual Reset Button can also reactivate the Deactivator unit by pressing and holding down for a predetermined amount of time. This can also be accomplished at the in-synch Detector/Receiver Main Unit (FIGS. 1 & 2).

Rechargeable Battery: This replaceable, rechargeable battery will power the Gas Deactivator in case of power outages or where power is not accessible.

110 v Plug-in: Receiver powered by any grounded 110 v outlet. This Plug-in will be able to be rotated out of the way in case it is necessary to do a flush wall mount where 110 v power is not being utilized.

Channel Selection Door: Under this door are a series of DIP switches that can accomplish a series of programmable features of the Water Deactivator.

Gas Sniffing Sensor: The Gas Sniffing Sensor will be utilized where the unit will be a stand alone unit that it will be monitoring itself. This sensor would not be needed if it is in line with other Gas Deactivators and it is only awaiting an RF signal from another Gas Deactivator. However, there is no harm in utilizing the Gas Sniffing Sensor even if the end-user has no use for it at the desired location.

Gas Solenoid: The Gas Solenoid is controlled by the Gas Deactivator. The solenoid will remain open until it is signaled to close by an RF signal. It can be reset by the Gas Deactivator Manual Reset Button, or the Receiver/Transmitter Main Unit (FIGS. 1 & 2).

Example 7

Figure 13:
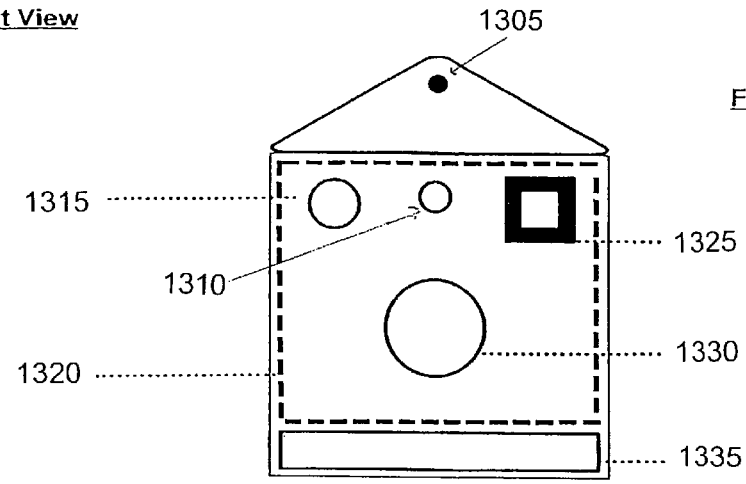
Figure 14:
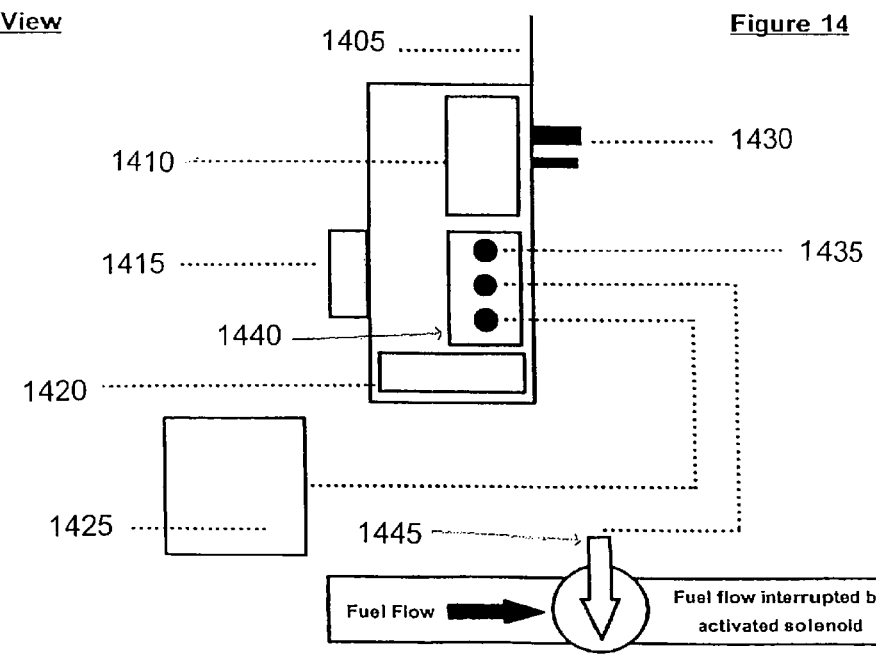

110V or Battery Operated Transmitter/Restrictor Carbon Monoxide Solenoid Deactivator The Carbon Monoxide Deactivator (FIGS. 13 & 14) is easily accessible to the end user and will notify the end user, by alarm, of potential hazards that may arise from Carbon Monoxide.

The Carbon Monoxide Deactivator disables the source of the hazard by utilizing a Carbon Monoxide Sensor and/or the use of a Carbon Monoxide Detector. When this sensor detects Carbon Monoxide, the deactivator shuts down the source of the Carbon Monoxide by tripping a solenoid which is in-line with the gas supply. The Deactivator can be a stand alone operated unit, or it can be synchronized with a detector/receiver unit (FIGS. 1 & 2). This allows an alarm on the Main Unit to sound in a central area that an end-user can be alerted to possible emergencies. The Main Unit will alarm when the Carbon Monoxide Deactivator sends a RF signal. The Carbon Monoxide Deactivator can also be reset from the Main Unit.

The Carbon Monoxide Deactivator has the ability to also operate off of 110 v or a rechargeable battery where 110 v source is not present.

FIGS. 13 & 14

Microphone: "Listens" for a high decibel alarm from other gas deactivators, allow other areas of the building to be shut down in a "domino effect." This is optional and controlled by the interior DIP switch settings, and thus can be turned off.

Alarm/Speaker: Begins to alarm at the moment of interruption to the corresponding gas deactivator. Can also be set to warn the end-user of a low-battery in the battery back up unit. This alarm can be silenced by actuating the manual reset button Power Indicator: Indicates that there is power to the Carbon Monoxide Deactivator unit, whether by 110 v or battery operation.

Internal Communication Antenna: Antenna sends an RF signal to the detector/receiver unit (FIGS. 1 & 2) in the event of a potential Carbon Monoxide hazard. This antenna will also accept the RF signal from the detector/receiver unit (FIGS. 1 & 2) for remote resetting purposes. Once the Carbon Monoxide Deactivator sends the signal back to the detector/receiver, a corresponding Fault LED Indicator will light (RED) and the Alarm/Speaker will sound to alert the end-user. This Internal Communication Antenna can also be utilized to synchronize the detector/receiver to the corresponding Carbon Monoxide Deactivator unit by utilizing DIP switch settings.

Manual Reset Button: The purpose of this button is to mute the alarm by pressing and releasing. The Manual Reset Button can also reactivate the Carbon Monoxide Deactivator unit by pressing and holding down for a predetermined amount of time. This can also be accomplished at the in-synch Receiver/Transmitter Main Unit (FIGS. 1 & 2).

Rechargeable Battery: This replaceable, rechargeable battery will power the Carbon Monoxide Deactivator in case of power outages or where power is not accessible.

110 v Plug-in: Receiver powered by any grounded 110 v outlet. This Plug-in will be able to be rotated out of the way in case it is necessary to do a flush wall mount where 110 v power is not being utilized.

Channel Selection Door: Under this door is a series of DIP switches that can accomplish a series of programmable features of the Carbon Monoxide Deactivator.

Carbon Monoxide Sensor: The Carbon Monoxide Sensor is utilized where the unit will be a stand alone unit. This sensor will not be needed if it is in line with other Carbon Monoxide Deactivators and it is only awaiting an RF signal from another Carbon Monoxide Deactivator. However, there is no harm in utilizing the Carbon Monoxide Sensor even if the end-user has no use for it at the desired location.

Carbon Monoxide Solenoid: The Carbon Monoxide Solenoid is controlled by the Carbon Monoxide Deactivator. The solenoid will remain open until it is signaled to close. It can be reset by the Carbon Monoxide Deactivator Manual Reset Button, or the Receiver/Transmitter Main Unit (FIGS. 1 & 2).

Example 8

110V/220V Transmitter/Restrictor Oil Furnace Deactivator

Figure 15:
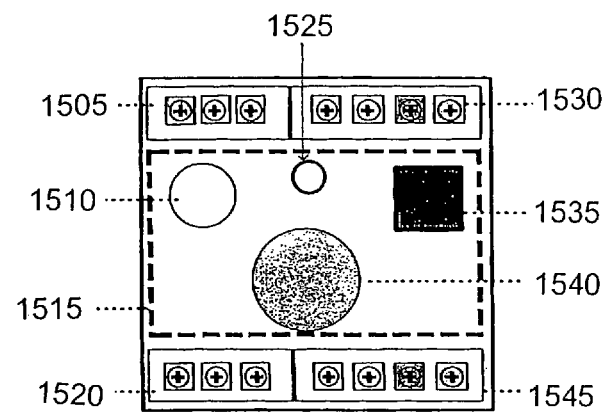

The 110 v/220 v Oil Furnace Deactivator (FIGS. 15 & 16) is easily accessible to the end user and will deactivate and notify, by alarm, of potential hazards that may arise from Oil Furnace fires.

The 110 v/220 v Oil Furnace Deactivator disables the source of the hazard by utilizing pre-existing smoke alarm/detectors. The 110 v/220 v Oil Furnace Deactivator shuts off the electricity and/or oil supply to the oil furnace. The 110 v/220 v Oil Furnace Deactivator can utilize an optional shut-off solenoid to shut off not only the flow of electricity to the oil furnace, but also the flow of oil, thus preventing the furnace from contributing to a fire. The 110 v/220 v Oil Furnace Deactivator can be a stand alone unit, or it can be synchronized with the detector/receiver Main Unit (FIGS. 1 & 2). This allows an alarm on the Main Unit to sound in a central area that an end-user can be alerted to possible emergencies. The Main Unit will alarm when the 110 v/220 v Oil Furnace Deactivator sends a RF signal. The 110 v/220 v Oil Furnace Deactivator can also be reset from the Main Unit. The 110 v/220 v Oil Furnace Deactivator has the ability to also operate off of 110 v/220 v or a rechargeable battery where 110 v source is not present.

FIGS. 15 & 16

Microphone: "Listens" for a high decibel alarm from pre-existing smoke alarm/detectors.

Alarm/Speaker: Begins to alarm at the moment of interruption to the 110 v/220 v Oil Furnace Deactivator. Can also warn the end-user of a low-battery in the battery back up unit in case of a power outage. Can be silenced by actuating the manual reset button.

Power Indicator: Indicates power to the 110 v/220 v Oil Furnace Deactivator unit, whether by 110 v or battery operation.

Internal Communication Antenna: This antenna sends an RF signal to the detector/receiver Main Unit (FIGS. 1 & 2) in the event of a potential Oil Furnace fire hazard. This antenna will also accept the RF signal from the Receiver/Transmitter Main Unit (FIGS. 1 & 2) for remote resetting purposes. Once the 110 v/220 v Oil Furnace Deactivator sends the signal back to the detector/receiver, a corresponding Fault LED Indicator lights (RED) and the Alarm/Speaker sounds to alert the end-user. This Internal Communication Antenna can also be utilized to synchronize the detector/receiver unit to the corresponding 110 v/220 v Oil Furnace Deactivator unit by utilizing DIP switch settings.

Manual Reset Button: Actuation mutes the alarm. The Manual Reset Button will also reactivate the 110 v/220 v Oil Furnace Deactivator unit by pressing and holding down for a predetermined amount of time. This can also be accomplished at the in-synch Receiver/Transmitter Main Unit (FIGS. 1 & 2).

Rechargeable Battery: This replaceable, rechargeable battery will power the 110 v/220 v Oil Furnace Deactivator in case of power outages or where power is not accessible.

110 v/220 v Hook-up: places the 110 v/220 v Oil Furnace Deactivator in line with the main electricity supplying the Oil Furnace. Electricity enters the top of the unit and if there are no smoke alarm/detectors sounding, the deactivator will allow the flow of electricity. It will only interrupt this flow if a smoke alarm/detector sounds. The optional solenoid can additionally or alternatively stop the flow of oil.

Channel Selection Door: Under this door will be a series of DIP switches that will accomplish a series of programmable features of the 110 v/220 v Oil Furnace Deactivator.

(Optional) 110 v/220 v Oil Furnace Deactivator Solenoid: The Oil Solenoid is controlled by the 110 v/220 v Oil Furnace Deactivator. The solenoid remains open until signaled to close by the 110 v/220 v Oil Furnace Deactivator.

It can be reset by the 110 v/220 v Oil Furnace Deactivator Manual Reset Button, or the detector/receiver Main Unit (FIGS. 1 & 2).

(Optional) 110 v Power Jack: supplies power to the 110 v/220 v Oil Furnace Deactivator if needed, such as in situations in which the flow of oil is controlled by another source not described here.

I claim:

1. A system for interrupting a utility supply to at least one appliance, said system comprising:
    a main unit including a detector capable of emitting a detector signal upon detection of a stimulus originating from a pre-existing detection device, said stimulus being an audio alarm signal indicative of present or incipient emergency circumstances and a receiver capable of receiving the detector signal and emitting a receiver signal, wherein said main unit is remotely located from the pre-existing detection device; and
    a deactivator including a transmitter capable of receiving the receiver signal and, in response, emitting a transmitter signal, and a restrictor which is capable of receiving the transmitter signal and in response, interrupting the utility supply to said at least one appliance, wherein said deactivator is remotely located from said main unit.

2. A system as in claim 1 wherein the at least one appliance is a stove.

3. A system as in claim 1 wherein the restrictor is physically interposed between that at least one appliance utility supply and the at least one appliance at a point which is between the at least one appliance and a wall.

4. A system as in claim 2 wherein the utility supply is a gas supply, and wherein the restrictor is physically interposed between the gas supply and the stove.

5. A system as in claim 2 wherein the utility supply is a wall electrical outlet, and wherein the restrictor is physically interposed between the wall electrical outlet and the stove.

6. A system as in claim 1 wherein the utility supply is a wall electrical outlet and the deactivator is physically interposed between the at least one appliance and the wall electrical outlet such that a power cord from the at least one appliance is plugged into the deactivator, and the deactivator is plugged into the wall electrical outlet.

7. A system as in claim 6 wherein the receiver is battery powered.

8. A system as in claim 6 wherein the receiver is powered by a power source via the wall electrical outlet.

9. A system as in claim 6 wherein the pre-existing detection device is a smoke detector.

10. A system as in claim 9 wherein the transmitter and the receiver are in two-way communication with each other.

11. A system according to claim 1, wherein the present or incipient emergency circumstances comprising one or more members of the group consisting of elevated temperatures, smoke, products of combustion, tremors and vibrations, audio patterns, carbon monoxide, changes in humidity and structural disturbances.

12. A system for interrupting a utility supply to at least one appliance, said system comprising:
    (a) a detector capable of emitting a detector signal upon detection of a stimulus, said stimulus being indicative of present or incipient emergency circumstances, wherein said stimulus originates from a pre-existing detection device, said pre-existing detection device is a device capable of detecting conditions selected from the group consisting of temperature, smoke, products of combustion, a tremor or vibration, carbon monoxide, humidity, and structural disturbances;
    (b) a receiver capable of receiving the detector signal and emitting a receiver signal, the receiver, the detector, or both the receiver and the detector being capable of automatically delaying emission of the detector signal;
    (c) a transmitter capable of receiving the receiver signal and, in response, emitting a transmitter signal; and,
    (d) a restrictor which is capable of receiving the transmitter signal and in response, interrupting the utility supply to said at least one appliance, said restrictor being capable of restricting the utility supply to a continuous or discrete range of degrees;
    wherein said transmitter and said restrictor are remotely located from said detector and said receiver.

13. A system according to claim hysteresis 12, wherein the stimulus comprises an audio alarm signal.

14. A system according to claim 12, wherein said detector and said receiver are integrated together in a control unit.

15. A system according to claim 12, wherein said transmitter and said restrictor are integrated together in a deactivator unit.

16. A system according to claim 12, wherein the receiver signal includes a radiofrequency signal.

17. A system according to claim 12, wherein the transmitter signal includes an electrical signal.

18. A system according to claim 12, further comprising means for remotely reactivating the restrictor and thereby resetting the utility supply to the at least one appliance.

* * * * *